(12) United States Patent
Tuggle, Jr.

(10) Patent No.: US 12,478,214 B2
(45) Date of Patent: Nov. 25, 2025

(54) STORAGE CONTAINER FOR GRILLING UTENSILS

(71) Applicant: David H. Tuggle, Jr., Alpharetta, GA (US)

(72) Inventor: David H. Tuggle, Jr., Alpharetta, GA (US)

(*) Notice: Subject to any disclaimer, the term of this patent is extended or adjusted under 35 U.S.C. 154(b) by 0 days.

(21) Appl. No.: 18/586,185

(22) Filed: Feb. 23, 2024

(65) Prior Publication Data

US 2025/0268423 A1 Aug. 28, 2025

(51) Int. Cl.
*A47J 47/16* (2006.01)
*A47J 37/07* (2006.01)
*B65D 25/00* (2006.01)
*B65D 25/04* (2006.01)

(52) U.S. Cl.
CPC .......... *A47J 37/0786* (2013.01); *A47J 47/16* (2013.01); *B65D 25/005* (2013.01); *B65D 25/04* (2013.01)

(58) Field of Classification Search
CPC .............. B65D 73/005; B65D 73/0014; A47F 2007/0092; A47F 5/0084; A47G 21/14; A47G 21/145; A47J 47/16
See application file for complete search history.

(56) References Cited

U.S. PATENT DOCUMENTS

| | | | | |
|---|---|---|---|---|
| 2,121,307 A * | 6/1938 | Swift | ............................. | 15/210.1 |
| 2,322,797 A * | 6/1943 | Fishel | .................. | A47B 81/007 211/69 |
| 4,697,854 A * | 10/1987 | Lunsford | .................. | B25J 21/02 312/223.5 |
| 5,243,931 A * | 9/1993 | McDonough | ........ | A01K 13/001 119/676 |
| 5,404,610 A * | 4/1995 | Coyer, Sr. | .............. | A63B 57/60 15/160 |
| 5,652,993 A * | 8/1997 | Kreyer | .................... | A46B 11/00 15/160 |
| 5,850,784 A * | 12/1998 | Conner | .................. | A47J 47/005 248/37.3 |
| 6,491,267 B1 * | 12/2002 | Feldman | ................ | A45D 20/12 248/176.1 |
| 6,502,711 B1 * | 1/2003 | McRae | ................... | B65D 75/42 211/74 |
| 6,745,424 B1 * | 6/2004 | Pimentel | ................ | A63B 47/04 15/21.2 |

(Continued)

FOREIGN PATENT DOCUMENTS

KR 20180055533 A * 5/2018
WO WO-2018134804 A2 * 7/2018 ............. A47G 21/00

(Continued)

*Primary Examiner* — Mollie Impink
(74) *Attorney, Agent, or Firm* — Charlena Thorpe, Esq.; Incorporating Innovation LLC

(57) ABSTRACT

Implementations of a storage container for housing grilling utensils comprise a plurality of surfaces (or sides) configured in the form of a closed box with an open interior and one or more slotted flexible openings therethrough. In some implementations, a method of using the storage container for housing grilling utensils comprises inserting the head of a grilling (or other suitable cooking) utensil through a slotted flexible opening of the storage container for housing grilling utensils into the interior of the storage container for housing grilling utensils.

16 Claims, 13 Drawing Sheets

(56) References Cited

U.S. PATENT DOCUMENTS

| | | | | |
|---|---|---|---|---|
| 8,196,250 | B2* | 6/2012 | Kawka | A46B 9/02 |
| | | | | 15/21.2 |
| 10,375,971 | B1* | 8/2019 | Tyminski | A01K 97/22 |
| 10,758,087 | B1* | 9/2020 | Infante | A47J 47/005 |
| 10,980,373 | B2* | 4/2021 | Cotto | A47J 47/16 |
| 2009/0321284 | A1* | 12/2009 | Miller | A46B 17/06 |
| | | | | 206/209 |
| 2011/0225834 | A1* | 9/2011 | Cirilli | A45D 27/46 |
| | | | | 206/208 |
| 2017/0196342 | A1* | 7/2017 | Martin | A45D 44/04 |
| 2022/0380090 | A1* | 12/2022 | Bishop | B65D 25/04 |

FOREIGN PATENT DOCUMENTS

| | | | | |
|---|---|---|---|---|
| WO | WO-2018150401 A2 * | 8/2018 | | A47B 77/14 |
| WO | WO-2018154548 A2 * | 8/2018 | | A47B 77/14 |

* cited by examiner

STORAGE CONTAINER FOR GRILLING UTENSILS

TECHNICAL FIELD

This disclosure relates to implementations of a storage container for grilling utensils.

BACKGROUND

Outdoor grilling is a popular pastime. However, flies can make this pastime unsanitary as flies may land on grilling utensils, such as shown in FIG. 1, particularly the head of a grilling utensil that makes contact with food items while the utensil is held by the handle.

DETAILED DESCRIPTION

Implementations of a storage container for housing grilling utensils are provided. In some implementations, the storage container for housing grilling utensils comprises a plurality of surfaces (or sides) configured in the form of a closed box with an open interior and one or more slotted flexible openings therethrough.

In some implementations, the storage container for housing grilling utensils is configured to keep grilling (or any other suitable cooking) utensils safe from flies and sanitary.

In some implementations, the storage container for housing grilling utensils is configured to receive the head of a grilling utensil within the interior through a slotted flexible opening of the storage container for housing grilling utensils to protect the utensil from contact by flies or other pests and keep the utensil sanitary.

In some implementations, the storage container for housing grilling utensils is configured to provide storage for any other suitable item, such as one or more condiments.

In some implementations, the storage container for housing grilling utensils is configured to provide a cutting board or similar surface.

In some implementations, a method of using the storage container for housing grilling utensils comprises inserting the head of a grilling (or other suitable cooking) utensil through a slotted flexible opening of the storage container for housing grilling utensils into the interior of the storage container for housing grilling utensils. In some implementations, a method of using the storage container for housing grilling utensils may comprise moving and/or removing the top side of the storage container for housing grilling utensils to access the interior of the storage container for housing grilling utensils (such as compartments formed therein) for storage use for condiments or other suitable items.

In some implementations, a method of using the storage container for housing grilling utensils may comprise removing the top side of the storage container for housing grilling utensils and using the top side as a cutting board or similar surface.

Figure 1:
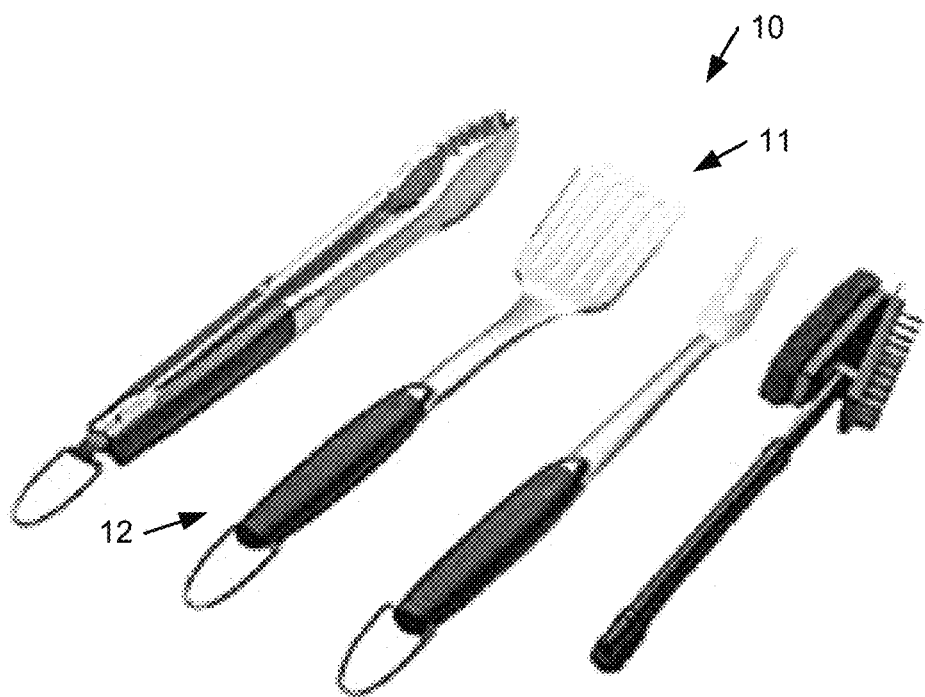
FIG. 1 illustrates example existing grilling utensils.

Outdoor grilling is a popular pastime. However, flies can make this pastime unsanitary as flies may land on grilling utensils 10, such as shown in FIG. 1, particularly the head 11 of a grilling utensil 10 that makes contact with food items while the utensil 10 is held by the handle 12.

Figure 2:
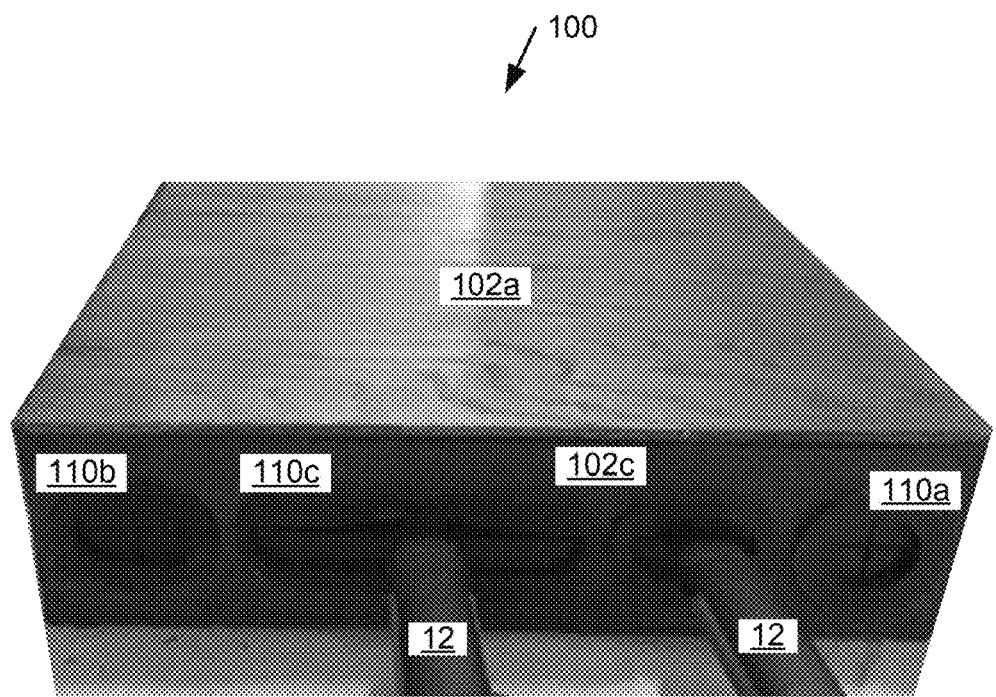
FIGS. 2-4 illustrate implementations of an example storage container for housing grilling utensils according to the present disclosure.
Figure 3:
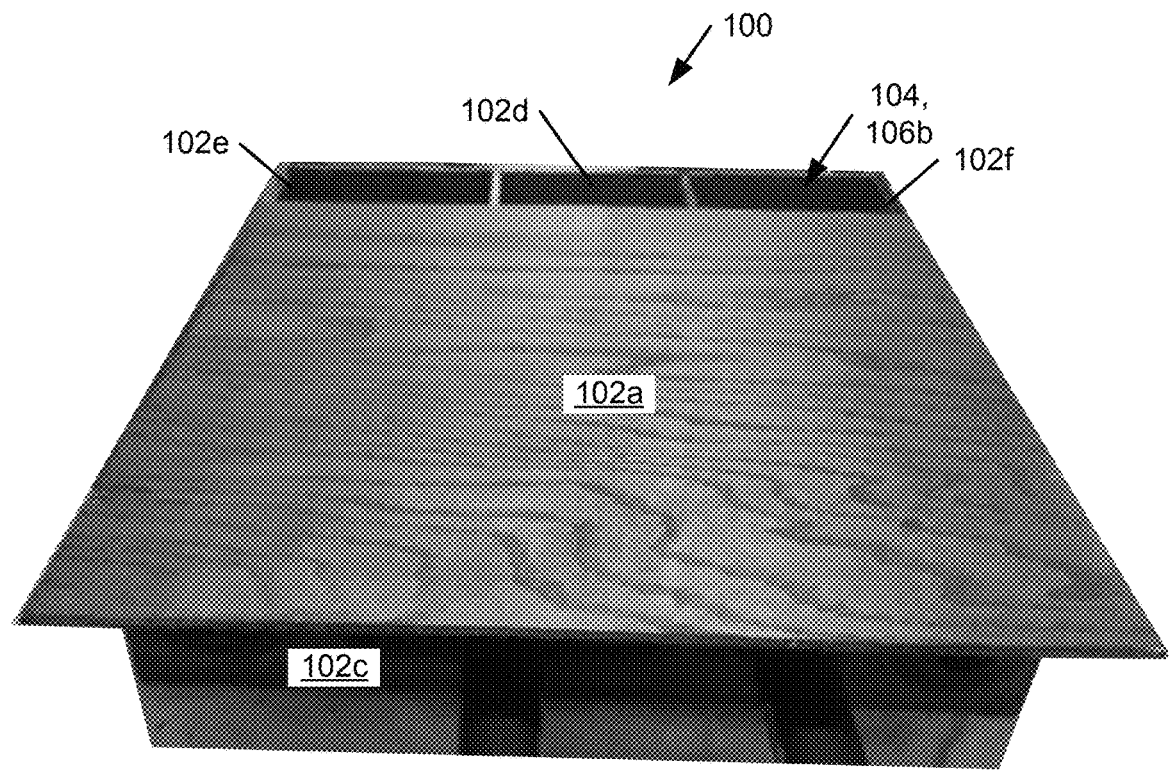
Figure 4:
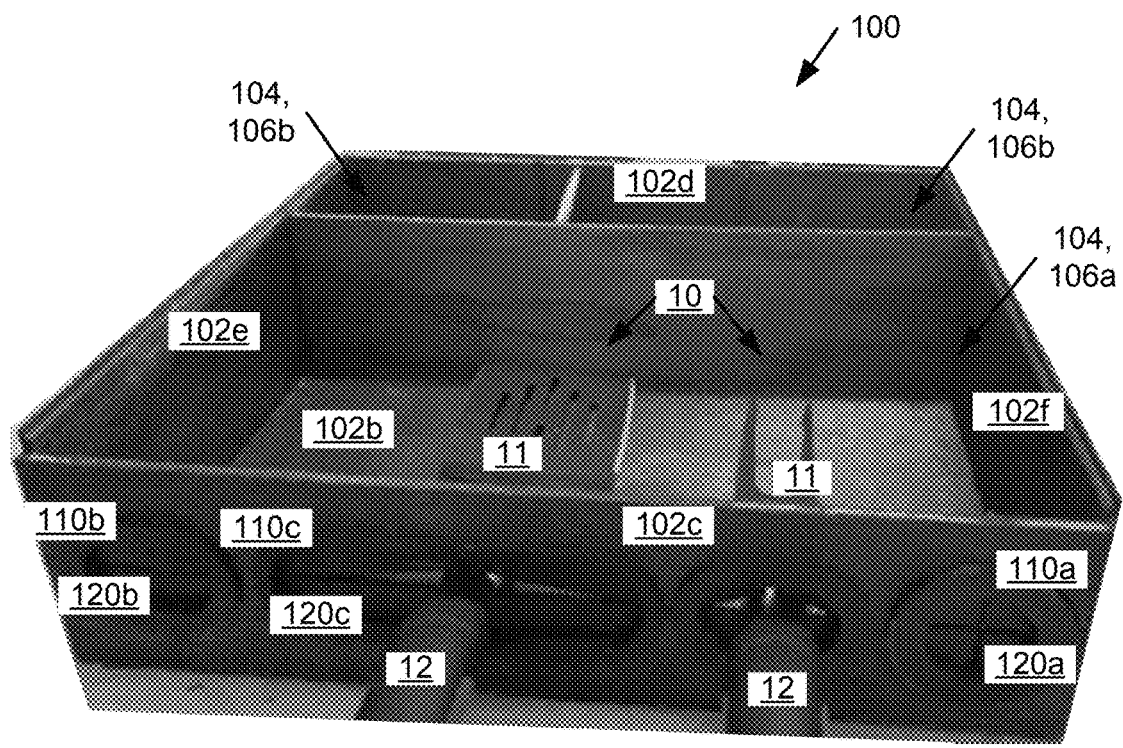

FIGS. 2-4 illustrate implementations of an example storage container for housing grilling utensils 100 according to the present disclosure. As shown in FIGS. 2 and 4, in some implementations, the storage container for housing grilling utensils 100 comprises six surfaces (or sides) 102 configured in the form of a closed box with an open interior 104. For example, in some implementations, the storage container for housing grilling utensils 100 comprises a top 102a, a bottom 102b, and four sides (e.g., front, back, left, and right) 102c, 102d, 102e, 102f.

In some implementations, the storage container for housing grilling utensils 100 may comprise any other suitable number of surfaces (or sides) 102 configured in any other suitable closed form with an open interior.

As shown in FIGS. 2 and 4, in some implementations, one side 102 (e.g., the front side 102c) comprises a plurality of openings 110. For example, in some implementations, the side 102 (102c) may comprise a small (e.g., circular shaped) opening 110a, a medium (e.g., oval or stadium shaped) opening 110b, and/or a large (e.g., elongated oval or stadium shaped) opening 110c.

In some implementations, the openings 110 may be any other suitable size and/or shape.

In some implementations, the openings 110 are configured (e.g., sized and/or shaped) to receive the head of a utensil (e.g., a utensil 10 of FIG. 1) to insert or remove the head 11 of the utensil 10 from the interior 104 of the storage container for housing grilling utensils 100.

As shown in FIG. 4, in some implementations, the openings 110 are filled with or comprise a flexible material (e.g., a flexible insert or grommet) 120. FIGS. 14-19 illustrate implementations of example flexible material 120 that fills (or covers) the openings 110, 110A of the storage container for housing grilling utensils of FIGS. 2-4 and FIGS. 5-13 respectively according to the present disclosure.

As shown in FIGS. 4, 14, 16, and 18, in some implementations, the flexible material 120 may comprise a small sized (e.g., circular shaped) flexible material 120a, a medium sized (e.g., oval or stadium shaped) flexible material 120b, and/or a large sized (e.g., elongated oval or stadium shaped) flexible material 120c. In some implementations, the flexible material 120 may be any other suitable size and/or shape.

Figure 14:
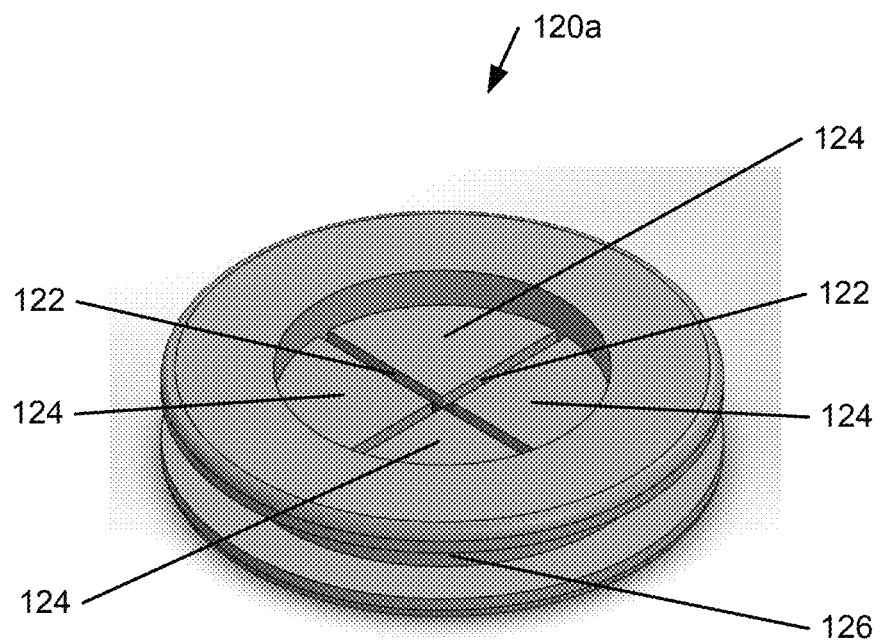
FIGS. 14-19 illustrate implementations of example flexible material that fills (or covers) the openings of the storage container for housing grilling utensils of FIGS. 2-4 and FIGS. 5-13 according to the present disclosure.
Figure 16:
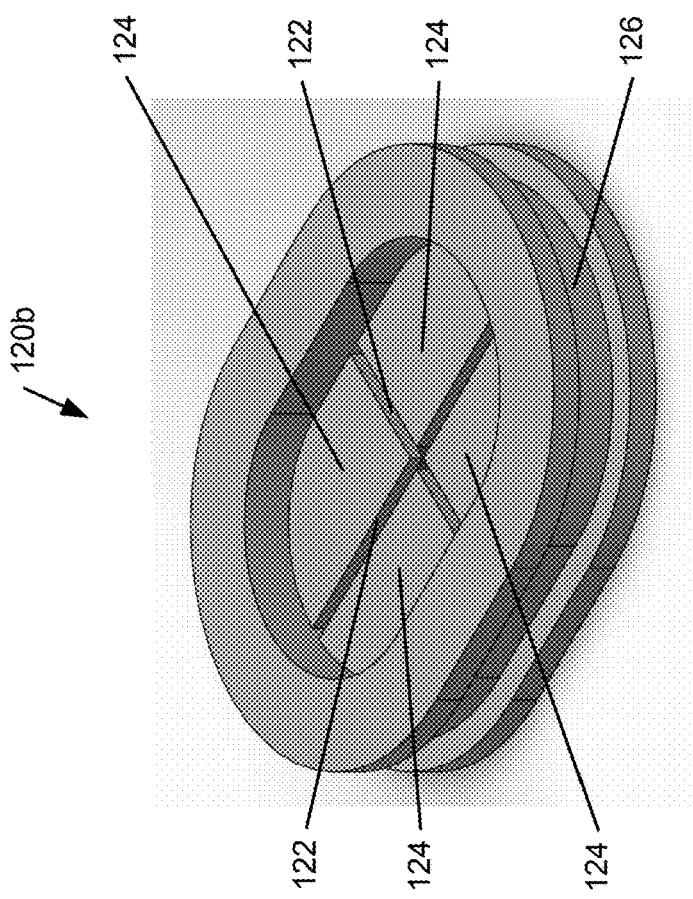
Figure 18:
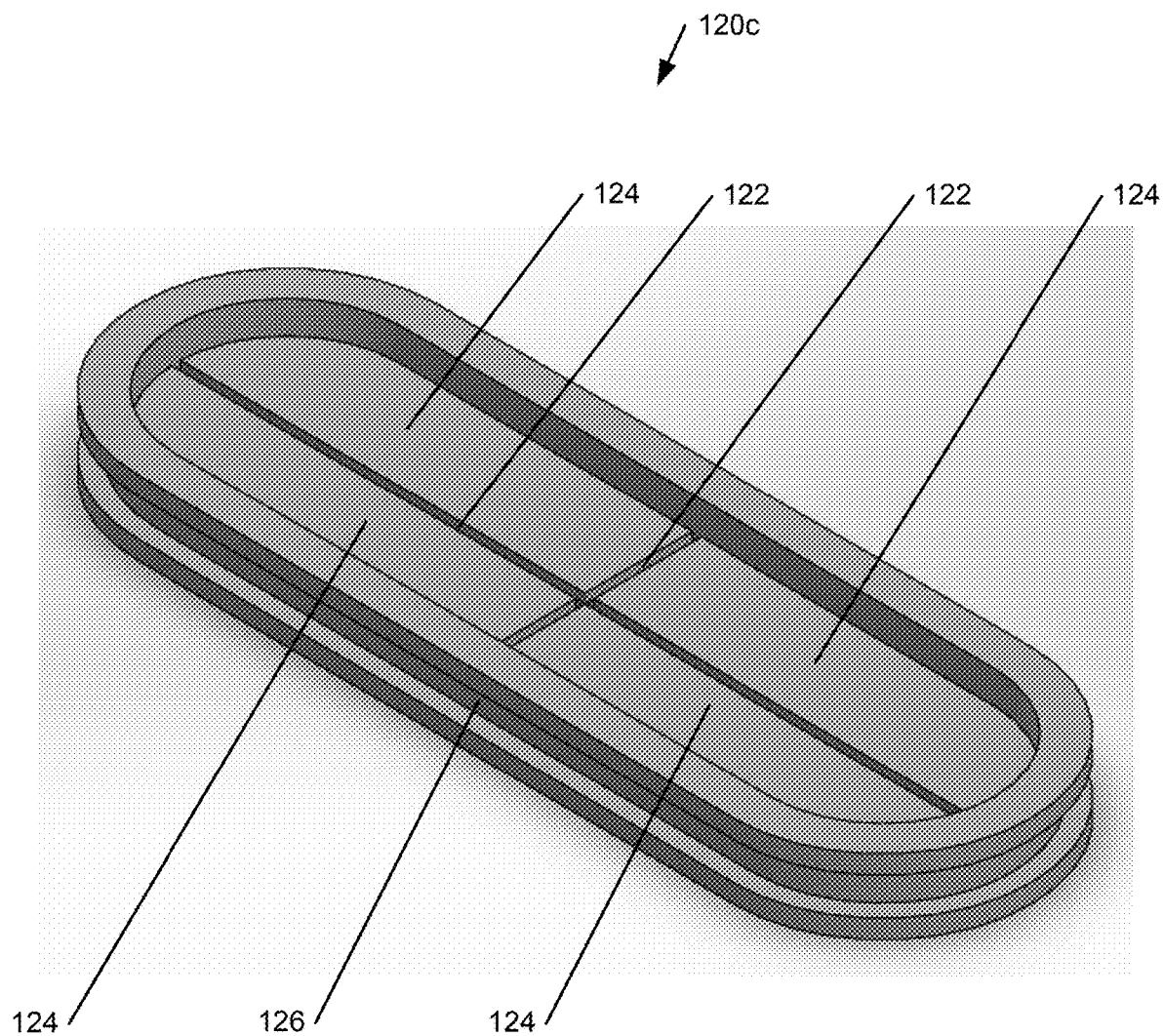

As shown in FIGS. 14, 16, and 18, in some implementations, the flexible material 120 (i.e., 120a, 120b, 120c) comprises a slit 122 (i.e., 122a, 122b, 122c) for receiving the head of a utensil 10. In some implementations, the flexible material 120 comprises a "t" (e.g., a letter t) or "+" (e.g., a plus sign or plus symbol) shaped slit 122 thereby forming four flaps 124 in the opening 110.

As shown in FIG. 3, in some implementations, the top surface (or side) 102a of the storage container for housing grilling utensils 100 is moveable to allow access to the interior 104 of the storage container for housing grilling utensils 100.

In some implementations, the top surface 102a of the storage container for housing grilling utensils 100 is removable. In this way, in some implementations, the top surface 102a can also be used as a cutting board or for any other suitable use.

As shown in FIG. 4, in some implementations, the interior 104 of the storage container for housing grilling utensils 100, opposite the openings 110, comprises one or more partitions forming one or more sections or compartments 106 (e.g., 106a, 106b) in the interior 104.

In some implementations, one or more of the compartments 106a are configured (e.g., sized and/or shaped) to receive the head (or at least the head portion) 11 of one or more utensils 10 inserted into the storage container for housing grilling utensils 100 through the openings 110. In some implementations, one or more of the compartments 106b are configured to provide storage for any other suitable item, such as one or more condiments.

In some implementations, the storage container for housing grilling utensils 100 is configured to keep grilling (or any other suitable cooking) utensils 10 safe from flies and sanitary.

In some implementations, the storage container for housing grilling utensils 100 is configured to receive the head 11 of a grilling utensil 10 within the interior 104 through an opening 110 of the storage container for housing grilling utensils 100 to protect the utensil 10 from contact by flies or other pests and keep the utensil 10 sanitary.

In some implementations, the storage container for housing grilling utensils 100 is configured (e.g., sized and/or shaped) to receive at least the head portion 11 of a grilling utensil 10 within the interior 104 of the storage container for housing grilling utensils 100 while allowing at least the handle portion 12 of the utensil 10 to extend outside of the interior 104 through an opening 110 of the storage container for housing grilling utensils 100.

In some implementations, the storage container for housing grilling utensils 100 is configured to provide storage for any other suitable item, such as one or more condiments.

In some implementations, the storage container for housing grilling utensils 100 is configured to provide a cutting board or similar surface.

Figure 5:
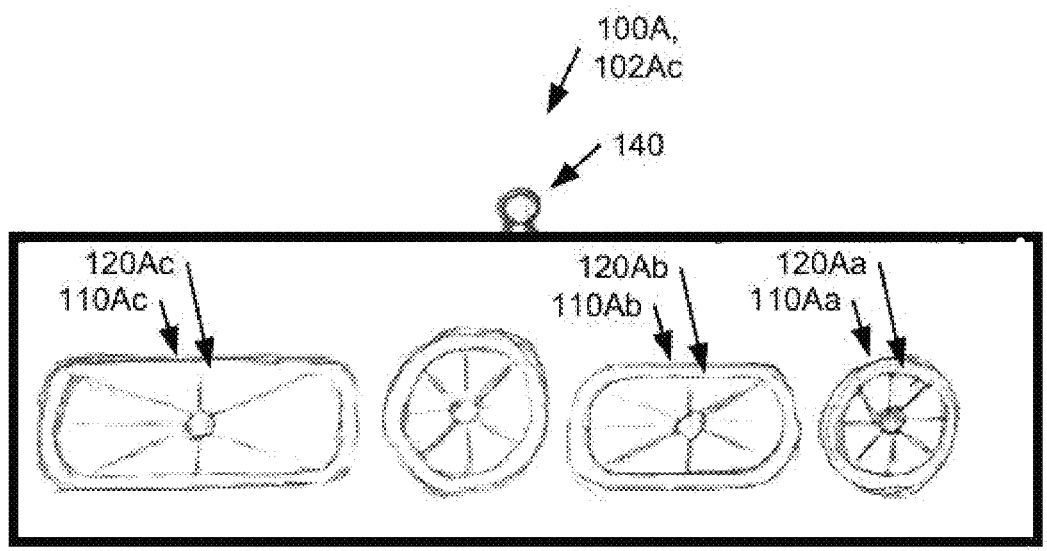
FIGS. 5-13 illustrate another implementation of an example storage container for housing grilling utensils according to the present disclosure.
Figure 6:
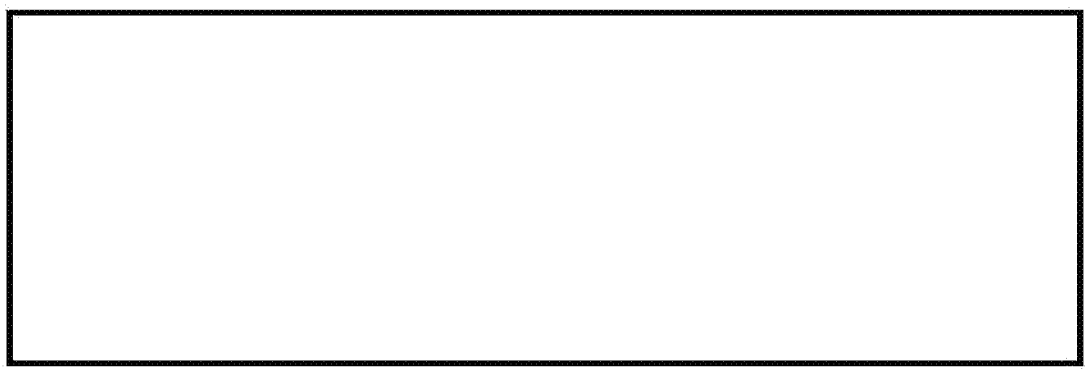
Figure 7:
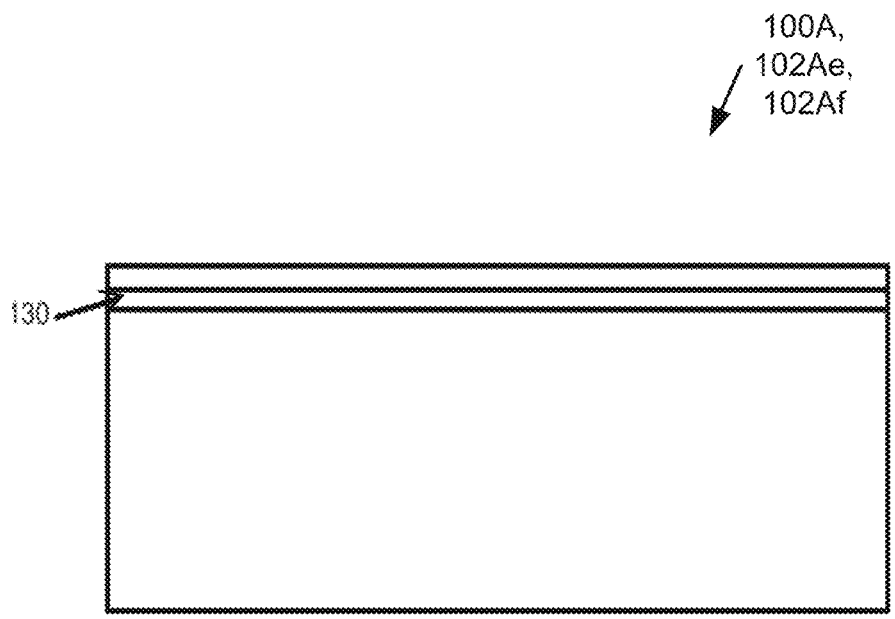
Figure 8:
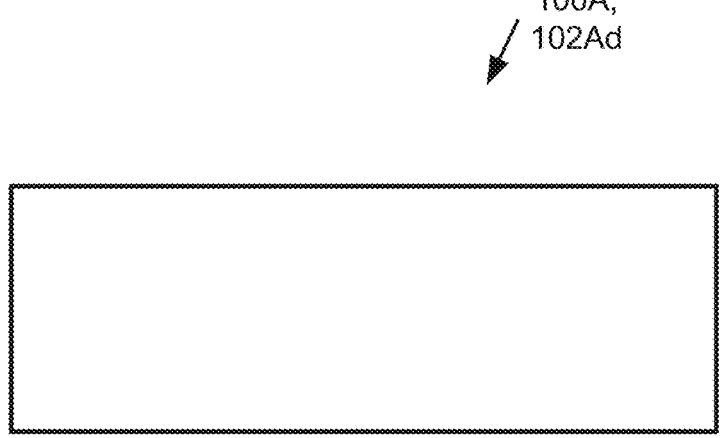
Figure 9:
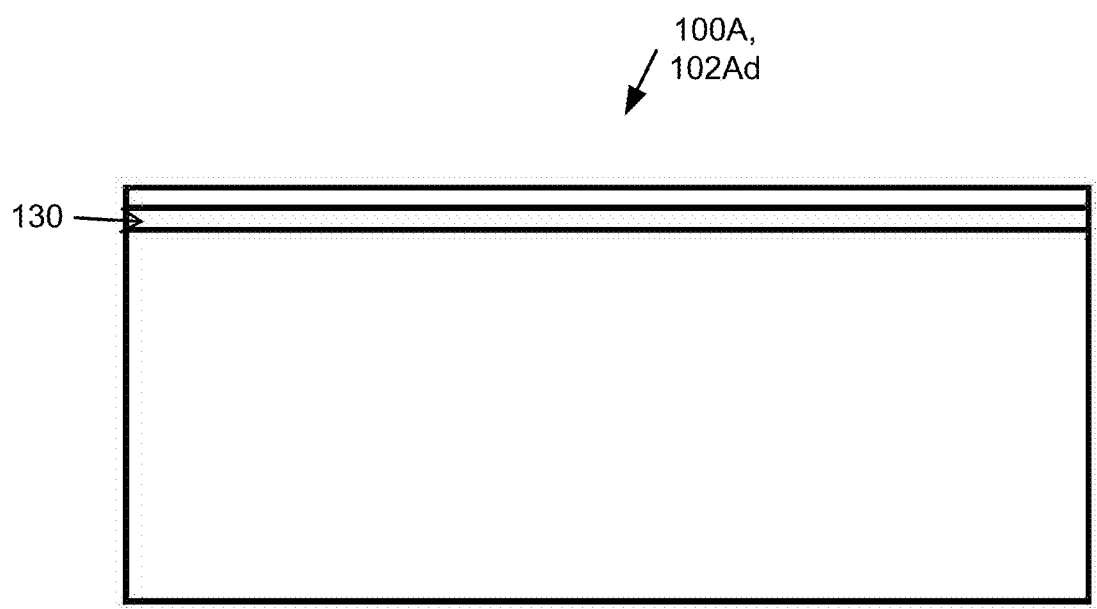

FIGS. 5-13 illustrate another implementation of an example storage container for housing grilling utensils 100A (collectively referred to below as the "storage container for housing grilling utensils 100") according to the present disclosure. FIG. 5 illustrates an exterior view of the front side 102Ac of the storage container for housing grilling utensils 100A. FIGS. 6 and 7 illustrate exterior and interior views respectively of the left and right sides 102Ae, 102Af of the storage container for housing grilling utensils 100A. FIGS. 8 and 9 illustrate exterior and interior views respectively of the back side 102Ad of the storage container for housing grilling utensils 100A.

Figure 10:
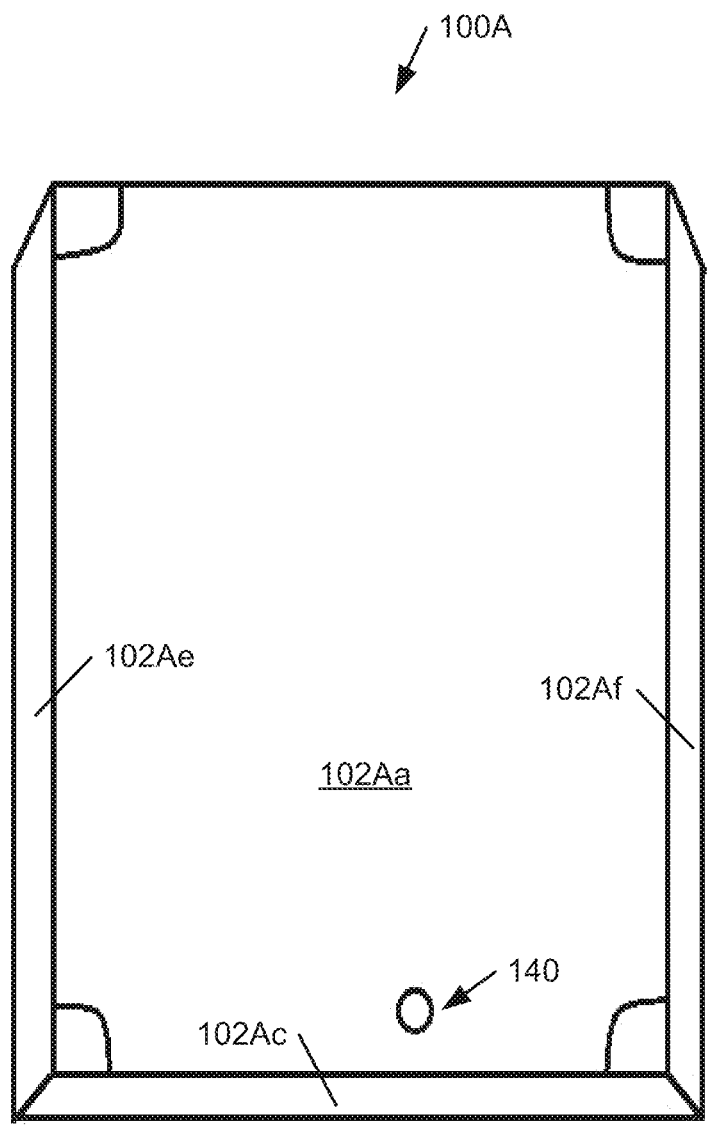
Figure 11:
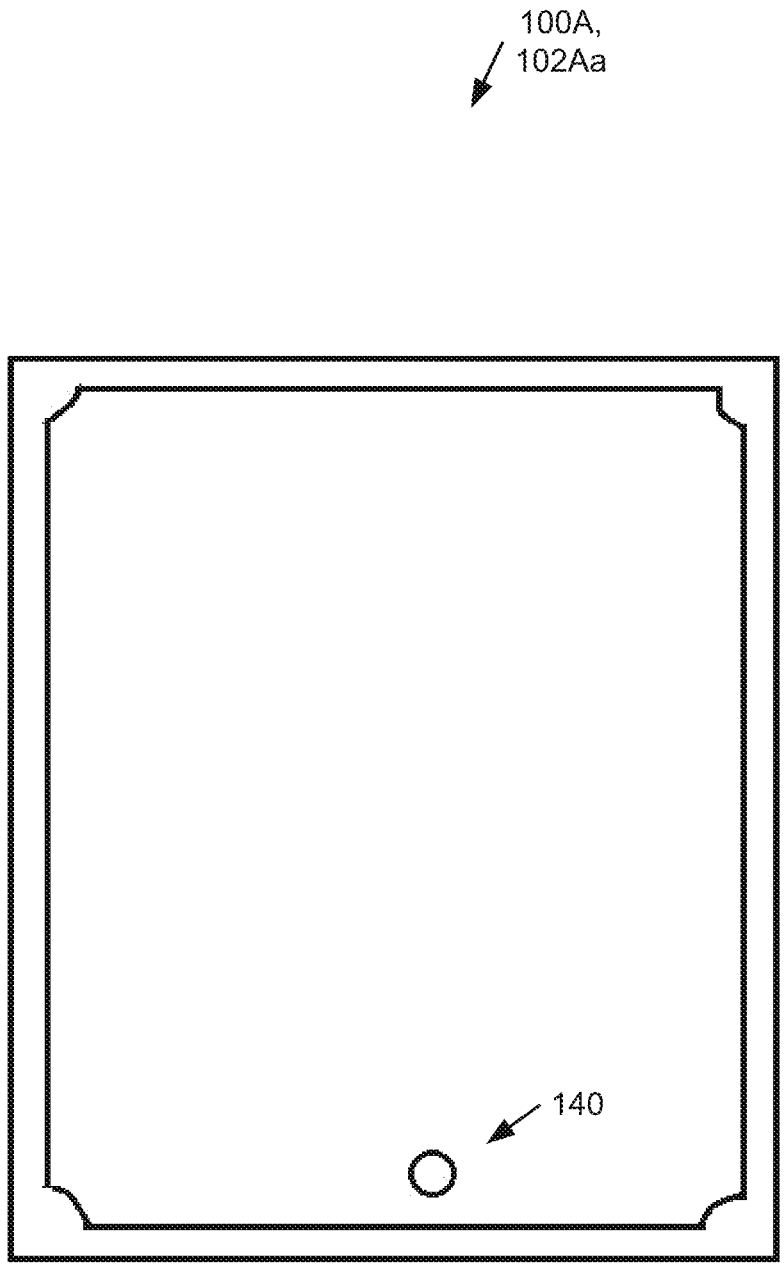
Figure 12:
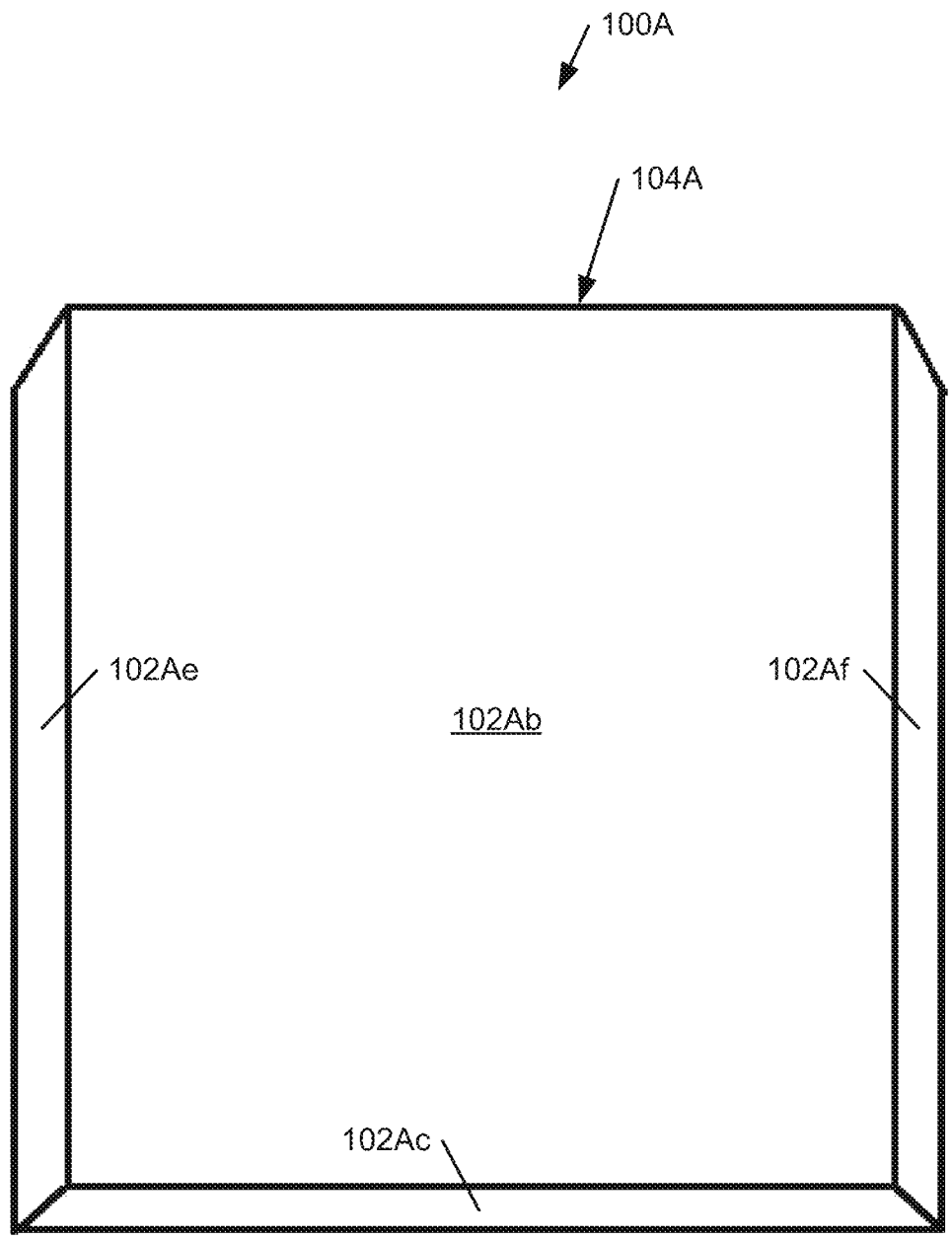
Figure 13:
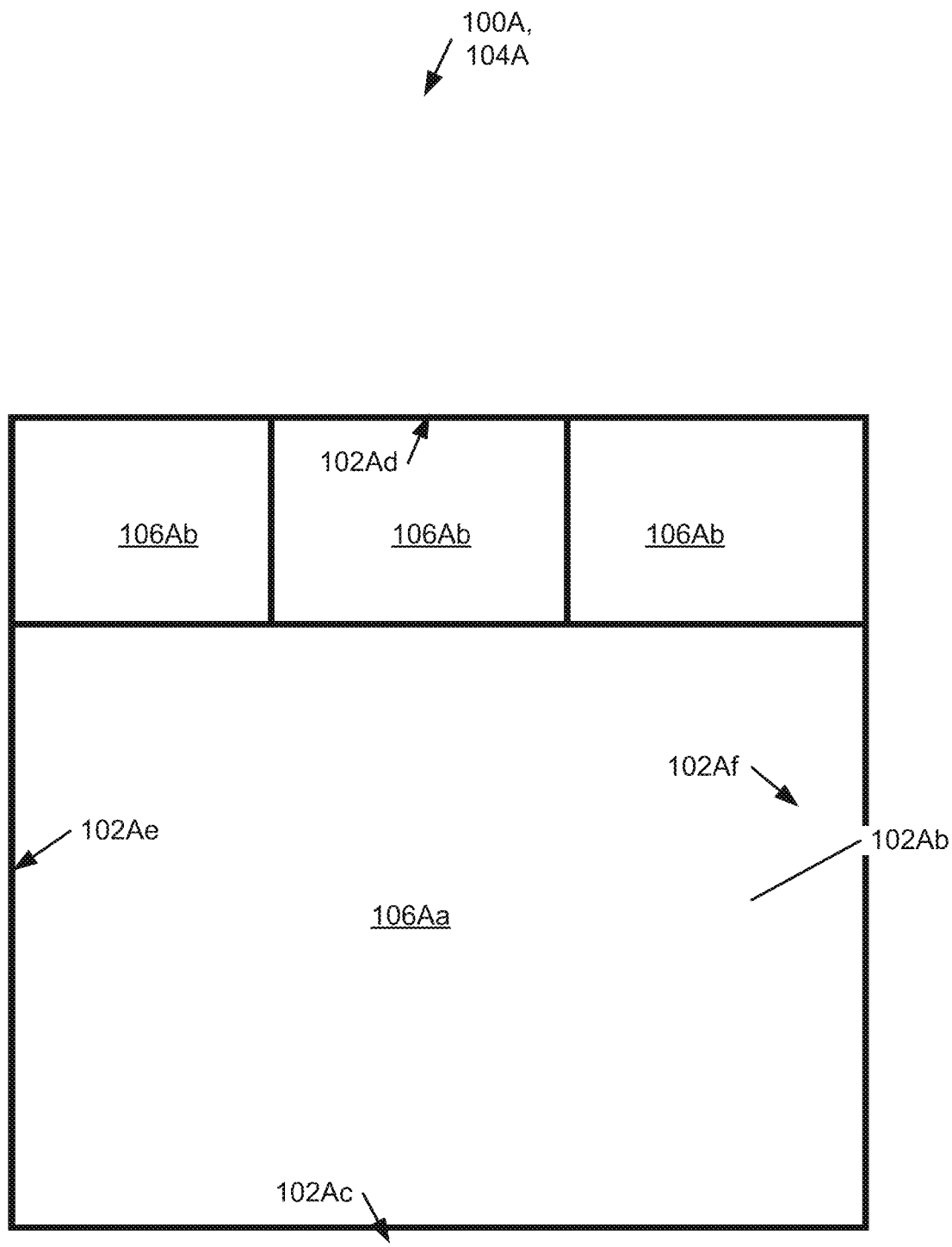

FIG. 10 illustrates an exterior, top view of the storage container for housing grilling utensils 100A. FIG. 11 illustrates an exterior view of the top side 102Aa of the storage container for housing grilling utensils 100A. FIG. 12 illustrates a perspective view of the interior 104A (without compartments 106A) of the storage container for housing grilling utensils 100A. FIG. 13 illustrates a top view of the interior 104A (with compartments 106A) of the storage container for housing grilling utensils 100A.

In some implementations, the storage container for housing grilling utensils 100A is the same or similar to the storage container for housing grilling utensils 100 described herein for FIGS. 2-4. For example, as shown in FIGS. 5-10, 12. and 13, in some implementations, the storage container for housing grilling utensils 100A comprises six surfaces (or sides) 102A configured in the form of a closed box with an open interior 104A that are the same or similar respectively to the six surfaces (or sides) 102 configured in the form of a closed box with an open interior 104 of FIGS. 2-4.

As shown in FIGS. 7 and 9, in some implementations, the storage container for housing grilling utensils 100A may further comprise a groove 130. In some implementations, the groove 130 extends along the length of the inner surface of the left side 102Ae, right side 102Af, and/or back side 102Ac. In some implementations, the groove 130 extends along the sides 102Ae, 102Af, 102Ac at or near the upward facing edge of the sides 102Ae, 102Af, 102Ac.

In some implementations, the groove 130 may extend in any other suitable configuration and/or position.

In some implementations, the groove 130 is configured to allow the top side 102Aa to be moved and/or removed from the closed position adjacent to the sides 102Ae, 102Af, 102Ac. For example, in some implementations, the groove 130 is configured to receive a portion (e.g., one or more edges) of the top side 102Aa such that the top side 102Aa can be moved and/or removed.

In some implementations, the top side 102Aa may be movable and/or removable from the sides 102Ae, 102Af, 102Ac in any other suitable way.

As shown in FIGS. 5, 10, and 11, in some implementations, the storage container for housing grilling utensils 100A may further comprise a knob or handle 140. In some implementations, the knob 140 is attached to the top side 102A.

In some implementations, the knob 140 may be attached to any other suitable part of the storage container for housing grilling utensils 100A.

In some implementations, the knob 140 is configured to assist in moving (or removing) the top side 102A of the storage container for housing grilling utensils 100A. In some implementations, the knob 140 is configured to assist in positioning and/or securing the top side 102A, such as for use of the top side 102A as a cutting board or another suitable use.

Figure 15:
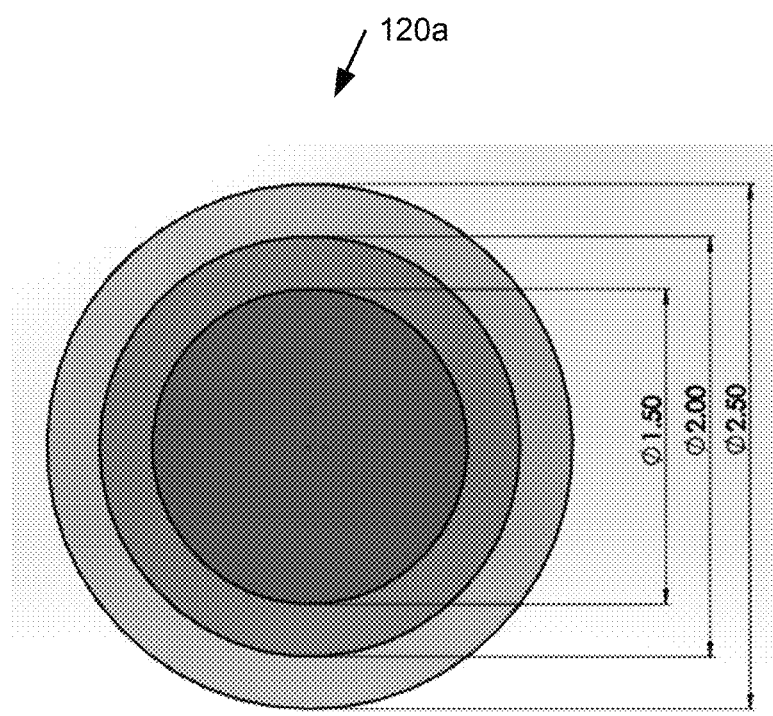

As described above, FIGS. 14-19 illustrate implementations of example flexible material (e.g., a flexible insert or grommet) 120 that fills (or covers) the openings 110, 110A of the storage container for housing grilling utensils of FIGS. 2-4 and FIGS. 5-13 respectively according to the present disclosure. FIGS. 14 and 15 illustrate views of an example small sized (e.g., circular shaped) flexible material 120a.

Figure 17:
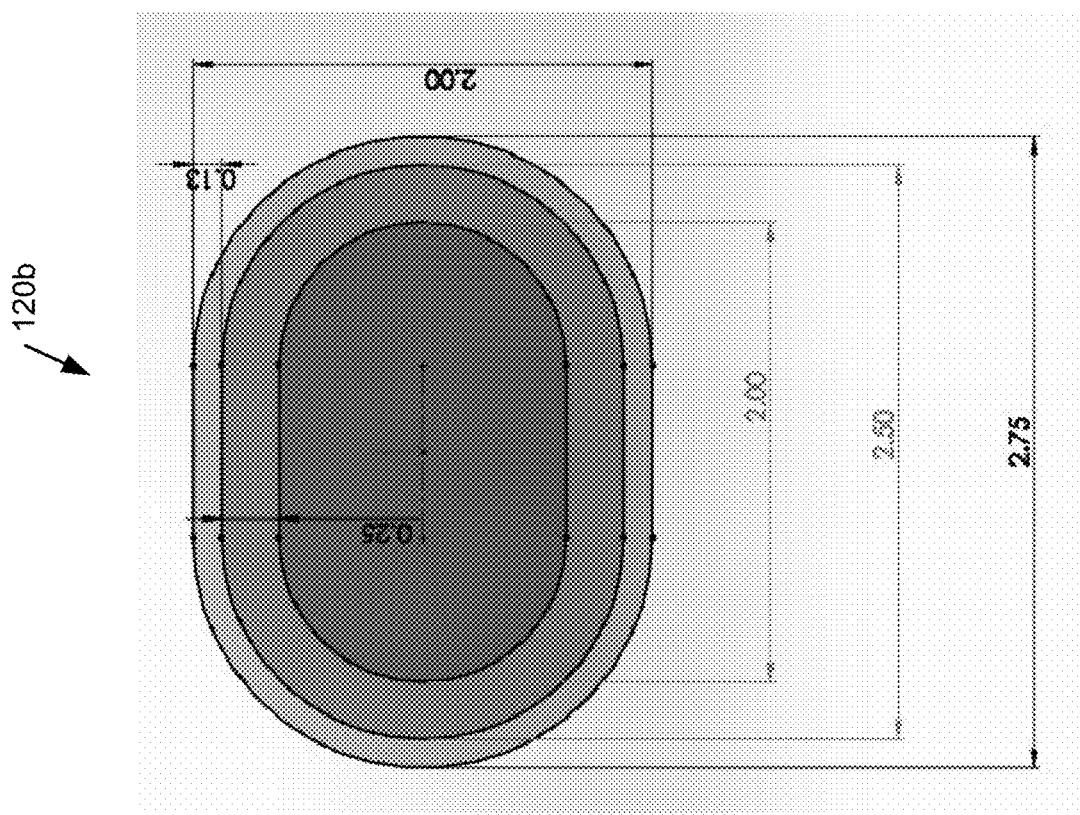
Figure 19:
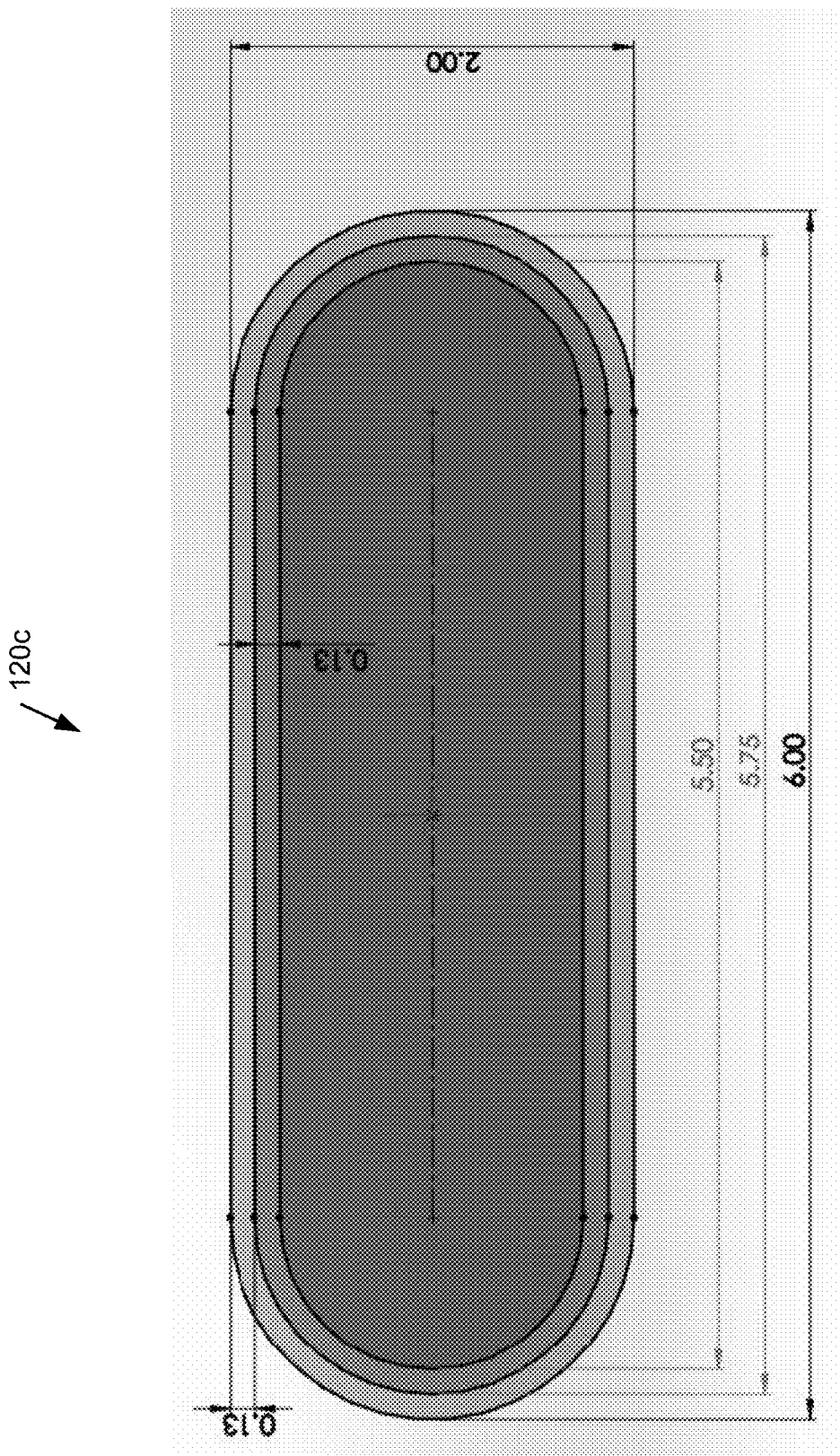

FIGS. 16 and 17 illustrate views of an example medium sized (e.g., oval or stadium shaped) flexible material 120b. FIGS. 18 and 19 illustrate views of an example large sized (e.g., elongated oval or stadium shaped) flexible material 120c.

As shown in FIGS. 14, 16, and 18, in some implementations, the flexible material 120a, 120b, 120c may further comprise a groove 126. In some implementations, the groove 126 extends around the perimeter of the flexible material 120a, 120b, 120c.

In some implementations, the groove 126 is configured to engage with the edge of the openings 110a, 110b, 110c of the storage container for housing grilling utensils 100 such that the flexible material 120a, 120b, 120c is secured in the opening 110a, 110b, 110c (e.g., similar to a grommet or insert).

In some implementations, the storage container for housing grilling utensils 100 comprises any suitable dimensions, such as the dimensions shown in FIGS. 5-13, 15, 17, and 19.

In some implementations, the storage container for housing grilling utensils 100 is composed of any suitable materials. For example, in some implementations, the storage container for housing grilling utensils 100 is composed of wood, plastic, and/or rubber materials.

In some implementations, the storage container for housing grilling utensils 100 can have any suitable appearance, such as the example appearance shown in the above-described figures.

In some implementations, an example method of using the storage container for housing grilling utensils 100, with respect to the above-described figures, comprises inserting the head of a cooking utensil (e.g., a grilling utensil 10 of FIG. 1) through an opening 110 of the storage container for housing grilling utensils 100 into the interior 104 of the storage container for housing grilling utensils 100.

In some implementations, the utensil 10 is inserted into the interior 104 such that at least the head portion 11 of the utensil is positioned in the interior 104 and at least the handle portion 12 of the utensil 10 extends outside of the interior 104, such as shown in FIGS. 2 and 4. In this way, in some implementations, the head 11 of the utensil 10 is protected from contact by flies or other pests and kept sanitary.

In some implementations, the utensil 10 is inserted by using the handle 12 of the utensil 10.

In some implementations, the method further comprises removing the head 11 of the utensil 10 from the interior 104 of the storage container for housing grilling utensils 100, such as to use the utensil 10. In some implementations, the utensil 10 is removed by using the handle 12 of the utensil 10.

In some implementations, a method of using the storage container for housing grilling utensils 100 may comprise moving and/or removing the top side 102a of the storage container for housing grilling utensils 100 to access the interior 104 (e.g., the compartments 106) of the storage container for housing grilling utensils 100, such as shown in FIGS. 3 and 4. In this way, in some implementations, other suitable items, such as condiments, can be stored and accessed from the interior 104 of the storage container for housing grilling utensils 100.

In some implementations, a method of using the storage container for housing grilling utensils 100 may comprise removing the top side 102a of the storage container for housing grilling utensils 100 and using the top side 102a as a cutting board or other suitable use.

The figures, including photographs and drawings, comprised herewith may represent one or more implementations of the storage container for housing grilling utensils.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. A storage container for grilling utensils comprising:
a bottom and a plurality of sides defining an open interior to form an open top container and a lid configured to form a closed container when placed on top of the open top container wherein:
the sides comprise a right side, a left side, and a back side;
the front side comprises a plurality of openings wherein each opening extends through the front side and comprises a flexible slotted material mounted inside each opening and wherein each opening is sized and shaped that the heads of the grilling utensils extend through the openings and into the open interior; and
the open interior comprises one or more partitions forming at least tow compartments wherein a first compartment is sized to receive the grilling utensil heads received through the plurality of openings and a second compartment is located behind the first compartment and adjacent to the back side.

2. A method of using the storage container for grilling utensils of claim 1 comprising inserting a grilling utensil head horizontally into the open interior through a slotted flexible opening such that the grilling utensil head extends through the opening and into the open interior.

3. A method of using the storage container for grilling utensils of claim 2 comprising removing the top side from the storage container and using the top side as a cutting board.

4. A method of using the storage container for grilling utensils of claim 2 comprising removing the lid from the storage container and using the lid as a cutting board.

5. The storage container of claim 1 further comprising a handle extending from the lid.

6. A method of using the storage container for grilling utensils of claim 5 comprising moving the lid using the handle.

7. A method of using the storage container for grilling utensils of claim 1 comprising using the lid as a cutting board.

8. The storage container of claim 1 wherein the plurality of openings comprise at least two different sizes.

9. A method of using the storage container of claim 1 comprising:
inserting a grilling utensil head horizontally into the open interior through the slotted flexible opening such that the grilling utensil extends horizontally through the opening and the open interior in the first compartment; and
moving the lid of the storage container to access the open interior; and
storing condiments in the second compartment separate from the first compartment.

10. A method of using the storage container for grilling utensils of claim 1 comprising:
inserting a grilling utensil head horizontally into the open interior through the slotted flexible opening such that the grilling utensil extends horizontally through the opening and the open interior; and using the lid as a cutting board.

11. A storage container for grilling utensils comprising:

a plurality of sides defining an open interior, wherein the sides comprise:
- a top side;
- a bottom side;
- a front side;
- a back side;
- a left side; and
- a right side;

wherein the top side is removeable;

wherein the front side comprises a plurality of openings wherein each opening extends through the front side and comprises a flexible slotted material mounted inside the opening and wherein each opening is sized and shaped to receive a grilling utensil head through the opening and into the open interior such that the heads of the grilling utensils extend through the openings and into the open interior; and wherein at least two of the plurality of openings have different shapes.

12. A method of using the storage container for grilling utensils of claim 11 comprising inserting a plurality of grilling utensil heads into the open interior through the plurality of openings such that the heads of the grilling utensils extend through the openings and into the open interior.

13. A method of using the storage container for grilling utensils of claim 11 comprising using the top side as a cutting board.

14. A method of using the storage container for grilling utensils of claim 11 comprising moving the top side using the handle.

15. A method of using the storage container of claim 11 comprising:

inserting a plurality of grilling utensil heads horizontally into the open interior through the plurality of openings such that the grilling utensils extend horizontally through the openings and the open interior in a first compartment; and moving the top side of the storage containing to access the open interior; and storing condiments in a second compartment separate from the first compartment.

16. A method of using the storage container for grilling utensils of claim 11 comprising:

inserting a plurality of grilling utensil heads horizontally into the open interior through the plurality of openings such that the grilling utensils extend horizontally through the openings and the open interior; and using the top side as a cutting board.

* * * * *